Oct. 28, 1958  A. F. TURNER ET AL  2,858,240
THIN FILMS, FILM COATED ARTICLES AND METHODS OF MAKING SAME
Filed May 18, 1953
FIG. 5
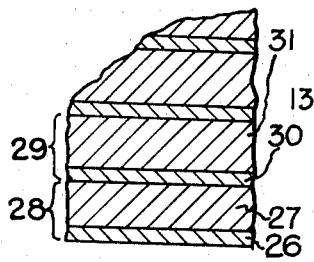
FIG. 2
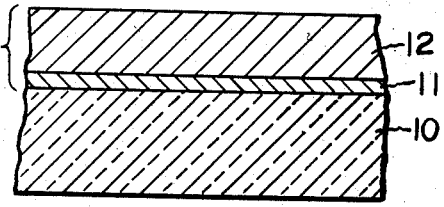
FIG. 3
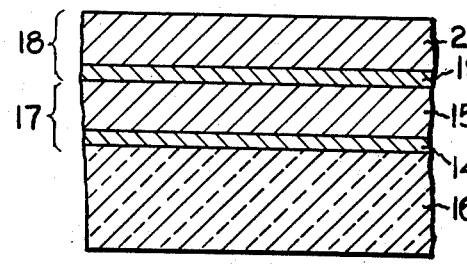
FIG. 4
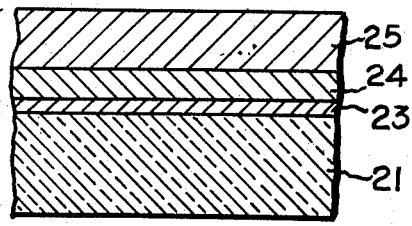
FIG. 1
| MATERIAL | BREAK-DOWN OR DETERIORATION THICKNESS IN QUARTER-WAVE L'GTHS. AT 546 mμ | STRESS COEFFICIENT IN UNITS PER QUARTER-WAVE L'GTH. T=TENSION C=COMPRESSION |
|---|---|---|
| $Sb_2O_3$ | 3 | C=.004 |
| $MgF_2$ | 10 | T=.10 |
| CRYOLITE | 20 | T=.061 |
| CHIOLITE | 25 | T=.029 |
| $SnO_2$ | 58 | T=.008 |
| $MoO_3$ | 96 | T=.01 |
| ZnS | 100 | C=.02 |
INVENTOR.
A. F. TURNER
BY F. K. TRUBY
ATTORNEY

United States Patent Office 2,858,240
Patented Oct. 28, 1958

2,858,240

THIN FILMS, FILM COATED ARTICLES AND METHODS OF MAKING SAME

Arthur F. Turner, Brighton, N. Y., and Frank K. Truby, Socorro, N. Mex., assignors to Bausch & Lomb Optical Company, Rochester, N. Y., a corporation of New York Application May 18, 1953, Serial No. 355,682

10 Claims. (Cl. 117—215)

This invention relates to thin films, articles coated with thin films and methods of making the same. More particularly it relates to stress-compensated films, articles coated with stress-compensated films and methods of making the same.

The subject matter of this patent may be used by or for the Government for Governmental purposes without the payment of any royalties to us.

Thin films of material for various purposes have been known and used for some time. Thus, in the optical field, highly reflecting multilayer coatings make use of many component films, each film varying in thickness, for example, from about one quarter wave length to one wave length or more, which are generally deposited by high vacuum evaporation techniques on a base in superimposed relation. When films are superimposed successively upon each other, only a relatively small number of layers can be deposited before the whole coating deteriorates by cracking or peeling from the base, by becoming cloudy, or in some other way becoming objectionable for its intended use. In making optical filters for use in the infra red region of the spectrum, relatively thick multilayer coatings are often required, but are not generally available under prior art methods. The production of these filters has been restricted because of the thickness limit imposed by the deterioration of the coating.

In the electrical field, relatively thick nonmetallic coatings and sheets of films are useful as substitutes for mica for spacers in vacuum tubes and for insulators. This use is especially important in view of the short supply of mica. However, using the prior art it was not feasible to produce sheets of films sufficiently thick to be of use in this field.

One of the objects of this invention, therefore, is to overcome the above-mentioned disadvantages and provide an article having a relatively thick coating comprising a plurality of thin films superimposed one on the other.

Another object of this invention is to provide a base having a relatively thick coating comprising thin films forming a set which is substantially free from net mechanical stress.

Still another object of this invention is to provide a coating of films on a base having a slight excess of compressional or tensional stress in controlled amounts.

A further object of this invention is to provide a plurality of mechanically stress-free sets of films superimposed upon each other on a base.

A still further object of this invention is to provide a stress-compensated sheet of films by superimposing several stress-free sets of films on each other.

Another object of this invention is to provide a novel method for producing stress-free coatings on a base.

Still another object of this invention is to provide a novel method for producing stress-free sheets of films.

A further object is to provide a method for controlling the amount and kind of mechanical stresses in superposed thin films.

Other objects and advantages pertaining to the construction of the coating and sheets and to the form and relation of elements thereof will more readily appear from the following description taken in connection with the accompanying drawings.

Fig. 1 is a chart showing some of the quantitative values for a few of the more commonly used materials for making thin films.

Fig. 2 is an enlarged sectional view of one embodiment of the invention showing one form of a stress-free or stress-compensated set of thin films on a base.

Fig. 3 is an enlarged sectional view through a plurality of stress-free or stress-compensated sets of films on a base.

Fig. 4 is an enlarged sectional view through another form of a stress-free or stress-compensated set of films on a base.

Fig. 5 is an enlarged sectional view of a stress-compensated sheet of films.

It has been found that when a material is deposited on a base as a thin film, an internal mechanical stress will often be developed. Thus, compression stresses are developed in films of some materials, films of other materials develop tension stresses, while films of still other materials show negligible stresses. The relative quantitative values of these mechanical stresses can be measured for each material and expressed in arbitrary units of a stress per unit thickness of the film. One method of determining the relative stress in a film of material is to support by one end a 2″ long glass fiber approximately 50 microns in diameter near the base or substrate in the path of evaporated material and at the same distance from the source of material as the base or substrate. After a preselected thickness of material has been deposited on the base and fiber as determined, for example, by spectrophotometric reflection measurements from the base in a manner well known in the art, a measurement is made of the total amount of deflection of the free end of the fiber which occurred between the beginning and the end of deposition. This will be the amount of deflection for a preselected thickness from which the deflection per unit thickness of the deposited film may then be determined. This deflection per unit thickness is proportional to the stress within the film and will be called a stress coefficient throughout this specification and claims.

Whether the kind of stress coefficient is tension or compression is determined by the direction of the deflection of the fiber from its initial position. If the fiber curls toward the evaporation source the film stress is tension, if the fiber curls way from the source the stress is compression. The fiber response or deflection is preferably observed continuously during deposition with a telescope mounted outside the high vacuum system, or the curl of the fiber may be measured after removal from the system. It is desirable to determine the kind and amount of the stress coefficient under standard and reproducible conditions, such as, the temperature of the substrate, glass fiber diameter and length, degree of vacuum and rate of deposition. In practice, it is imperative that these same conditions be reestablished during deposition of a film combination which has been designed on the basis of said stress coefficients since for some materials a different value or amount of stress coefficient will result for each different set of deposition conditions.

According to the prior art, the maximum thickness of a multilayer coating of films on a base was relatively limited due not only to cracking and peeling of the films from the base but also to clouding deterioration of the films. It has been found that a factor contributing to this deterioration is an excess of mechanical stresses built up within the coating of films. According to the present invention, this excess stress may be internally compensated and a much thicker coating obtained than previously. This is accomplished by depositing a set of films on a base, one film having a tension stress and another film having a compression stress. By depositing the films so that the product of the number of unit thicknesses of the tension material times its tension stress coefficient is made equal to the product of the number of unit thicknesses of the compression material times its compression stress coefficient, a stress-free set of films is formed. The term "set" is used throughout this specification and claims to mean an assemblage of two or more films superposed on each other in a stress-free or a fully or partially stress-compensated relationship. A plurality of stress-free sets of films may be superposed on each other on a base to create a stress-free coating of films. The only limitation on the thickness of each single film of a material is that it cannot exceed the deterioration thickness for a film of that material. By means of this invention, it is possible to build up a coating of films having several stress-free sets of films whereby the sum total thickness of each material in the coating may be several times thicker than the maximum possible individual film thickness of that material.

It is possible under out invention to control the compensating stresses empirically by watching the effect each layer has on the above-referred to fiber within the vacuum chamber. This is especially true with some materials, such as zinc sulfide, which have different stress values for different evaporation or firing conditions and different substrate temperatures. With this material, increasing the firing rate increases the compression stress coefficient, whereas, increasing the substrate temperature decreases the compression stress coefficient. Under these circumstances, rather than to compute the stress compensating values, it is often better to achieve stress compensation empirically by mounting the fiber near the substrate during a multilayer deposition. The fiber will undergo deflections as each film is applied, so that a net zero stress will exist each time the fiber is brought to its initial position. Alternatively, if prescribed film thicknesses are required with such film materials, the observed response of the fiber may be used to control and adjust deposition conditions so that the proper mechanical stress value is maintained.

The chart in Fig. 1 lists a few non-metallic inorganic materials which may be employed in the present invention. The second column of the chart gives the maximum thickness to which each material can be deposited as a single film before it will deteriorate either by cracking or clouding and the third column lists the compression or tension stress coefficient for each of said materials. These coefficients are determined with the base or substrate initially at room temperature and having neither cooling nor heating intentionally applied to it except the heat incidentally radiated from the evaporation source during deposition. This temperature range of the substrate during evaporation is roughly 40° C. to 100° C. The films are deposited at rates commonly employed in the art whereby a one-quarter wave length film will be deposited in a matter of minutes. The stress cofficient as listed in Fig. 1 is based on unit optical film thickness, where the unit optical thickness is one-quarter wave length at 546 millimicrons. All of the stress coefficients in column 3 and all the maximum thicknesses of column 2, Fig. 1, have been determined while using substantially the same substrate temperature ranges and the same deposition rate common in the art. It should be understood that the values of Fig. 1 would be different for different deposition conditions.

Fig. 2 shows a stress-free set of magnesium fluoride and zinc sulfide films using the values of Fig. 1 as applied to the present teaching wherein a single film 11 of magnesium fluoride having a tension stress coefficient of .10 is disposed on a base 10 which may be of glass or other suitable material. Disposed on the magnesium fluoride film is a zinc sulfide film 12 having a compression stress coefficient of .02. Since the tension coefficient of the magnesium fluoride film is .10, it will require five unit thicknesses of zinc sulfide, each having a compression coefficient of .02, to form a set of films 13 in which the total tension and total compression stresses are equal so that the set of films 13 is substantially stress free. Likewise, the set of films 13 would be stress free if the film 11 of magnesium fluoride had a thickness of two quarter wave lengths and the film 12 of zinc sulfide had a thickness of ten quarter wave lengths. When magnesium fluoride and zinc sulfide are combined in a stress-free set, the maximum thickness allowable for any one film of magnesium fluoride from Fig. 1 is ten quarter wave lengths, therefore, only fifty quarter wave lengths of zinc sulfide are required in that set for complete stress compensation, which is well below the deterioration thickness for zinc sulfide.

Fig. 3 shows another example of a multilayer coating, namely, a molybdic oxide and zinc sulfide coating wherein, using values of Fig. 1, a molybdic oxide film 14 having a tension stress coefficient of .01 and a zinc sulfide film 15 having a compression stress coefficient of .02 are superimposed on a base 16. It is readily apparent that two unit thicknesses of molybdic oxide having a tension stress coefficient of .01 will compensate the compression stress of one unit thickness of zinc sulfide having a compression stress coefficient of .02 so as to form a stress-free set of films 17. A plurality of stress-free sets of films can be disposed on each other on a base to form a multilayer stress-free coating, as shown in Fig. 3. Disposed on the first stress-free set 17 is another stress-free set 18 having a film 19 of zinc sulfide and a film 20 of molybdic oxide with the thicknesses of the films having the same ratio as that of the stress coefficients, namely, 2 to 1, as in set 17.

The deterioration thickness for a stress-compensated multilayer coating is substantially independent of the single film deterioration thickness of its constituent components. For example, a test sample of a multilayer coating comprising fourteen stress-free sets of magnesium fluoride-zinc sulfide films had a total thickness of all films of zinc sulfide of four hundred and twenty quarter wave lengths which is several times greater than the single-film deterioration thickness for zinc sulfide given in column 2 of the chart of Fig. 1. The total thickness of all magnesium fluoride films within the coating was eighty-four quarter wave lengths which is well above the maximum single film thickness of ten quarter wave lengths as shown in Fig. 1. The total thickness of this stress-free coating was five hundred and four quarter wave lengths measured in green light.

In Fig. 4, a base 21 has a stress-free set of films 22 comprising three films 23, 24 and 25. For illustration, film 25 is a zinc sulfide film having a compression stress coefficient of .02, while the film 23 is a magnesium fluoride film with a tension stress coefficient of .10 and the film 24 is a molybdic oxide film with a tension stress coefficient of .01. To arrive at a stress-free set of films, it will require six quarter wave lengths of zinc sulfide to produce a compression stress to equal and compensate the tension stresses produced by one quarter wave length of magnesium fluoride and two quarter wave lengths of molybdic oxide. In this way, the sum of the products of the number of units of thickness of each compression film times its compression stress coefficient substantially equals the sum of the products of the number of units of thickness of each tension film times its tension stress coefficient to give a stress-free set of films.

Fig. 5 shows a stress-free sheet of films composed of, for instance, a film of zinc sulfide 26 which can be five quarter wave lengths thick and a film of magnesium fluoride one quarter wave length thick to form a stress-free set 28. Superimposed on this set is another stress-free set 29 formed of zinc sulfide film 30 five quarter wave lengths thick and one quarter wave length thick magnesium fluoride film 31. Since each set of films is stress-free, the whole sheet of films comprising several sets is also stress-free. These sheets of films are formed by depositing stress-free sets of films on a substrate in the manner described for Fig. 2 above. One way to separate the sheet from the substrate comprises selecting the substrate and film combination with a large differential in coefficients of expansion so that by maintaining the substrate at a high temperature during deposition of the various films, the sheet of films will peel from the substrate when removed from the deposition system and cooled. A difference in coefficients of expansion between the substrate and the films of 30% or more is sufficient to permit ready separation of the films from the substrate. These sheets, being stress-free, are easily cut into various shapes without cracking or chipping and as such have use as insulators and spacers in the electrical field.

For some purposes it may be desirable to so choose the thickness ratios of the tensional and compressional films that a slight excess compression results. This is preferable in some applications where the films may have a tendency to be scratched, since a set of films having an internal compressional stress will not propagate a scratch or crack but will retard its growth. However, a film under tensional stresses will propagate a crack which will ruin the film. A stress-free set of films will neither propagate nor retard cracking since it is stress neutral.

It will be apparent that in optical filter design where multilayer coatings with relatively thick component films are required, the optical design must be made compatible with stress compensation requirements.

The other materials shown in Fig. 1, namely, Cryolite ($Na_3AlF_6$), Chiolite ($2NaF \cdot AlF_3$) and tin oxide ($SnO_2$) all can be deposited to substantial thicknesses, as shown in column 2, before they deteriorate and each one has a tension stress coefficient as shown in column 3. The other material, $Sb_2O_3$, deteriorates at the relatively low value of three quarter wave lengths, but it does deposit with a slight compression stress coefficient. The chart, specification and claims illustrate a few common materials with their limiting values. This disclosure is not to be considered as limiting the invention either to the materials listed or to the apparent maximum thickness of one hundred quarter wave lengths.

To summarize the invention, it has been found that a thick multilayer coating of films can be built up on a base by a method of stress-compensation between materials having opposite mechanical stresses. By selecting materials having opposite mechanical stresses and by controlling the thicknesses of the films of the materials in accordance with their respective stress coefficients, it is possible to produce substantially stress-free sets of films or sets having an excess of a selected kind of stress. Relatively thick multilayer coatings can therefore be provided by the superposition of a plurality of such stress-free sets of films. Such thick multilayer coatings are employed, for example, in optical filters for use in the infra red region of the spectrum. It has been further found that a coating of stress-compensated sets of films can be removed from a base in a stress-compensated sheet. These sheets, being stress-compensated, have use as insulators and spacers in the electrical field.

Although only a few forms of this invention have been shown and described in detail, other forms are possible and changes may be made in the form and arrangement of the parts and substitutions may be made therein without departing from the spirit of this invention as defined in the claims herebelow.

We claim:

1. An article of manufacture comprising a base, at least one set of films carried on said base, each set of films comprising at least one film of zinc sulfide having an internal compression stress and at least one film of magnesium fluoride having an internal tension stress, each film having a thickness which is less than one hundred quarter wave lengths of light at 546 millimicrons, the zinc sulfide film being five times as thick as the magnesium fluoride film whereby the tension stresses and the compression stresses will be substantially equal and the set will be stress free.

2. An article of manufacture comprising a base, at least one set of films carried on said base, each set of films comprising at least one film of zinc sulfide having an internal compression stress and at least one film of molybdic oxide having an internal tension stress, each film having a thickness which is less than one hundred quarter wave lengths of light at 546 millimicrons, the molybdic oxide film being twice as thick as the zinc sulfide film whereby the tension stresses will be substantially equal to the compression stresses in each stress free set of films.

3. An article of manufacture comprising a base, a plurality of sets of films carried on said base, each set of films comprising at least one film of non-metallic inorganic material having a compression stress coefficient and at least one film of a different non-metallic inorganic material having a tension stress coefficient, each film having a thickness less than one hundred quarter wave lengths of light at 546 millimicrons, the sum of the products of the number of unit thicknesses of each compression film and its compression stress coefficient being substantially equal to the sum of the products of the number of unit thicknesses of each tension film and its tension stress coefficient whereby the tension and compression stresses substantially compensate each other in each set of stress-free films.

4. The method of manufacturing a stress-free coating of films on a base with each film having a thickness of less than one hundred quarter wave lengths of light at 546 millimicrons which comprises depositing on the base superposed films of different non-metallic inorganic materials with at least one film having an internal compression stress and at least one film having an internal tension stress, and controlling the stresses in the respective films by controlling the thicknesses thereof so as to provide a substantially stress-free coating.

5. An article of manufacture comprising a base, at least one set of thin films carried on the base, each set of films comprising at least one film of a non-metallic inorganic material having an internal tension stress coefficient and at least one film of a different non-metallic inorganic material having an internal compression stress coefficient, each film having a thickness of less than 100 quarter wave lengths of light at 546 millimicrons, the thicknesses of the films of different materials being such that the tension and compression stresses of the films of one set are substantially equal whereby the set is substantially stress free.

6. As an article of manufacture a sheet of superposed thin films comprising at least one set of films, each set comprising at least one film of a non-metallic inorganic material having an internal tension stress, and at least one film of a different non-metallic inorganic material having an internal compression stress, each film having a thickness which is less than 100 quarter wave lengths of light at 546 millimicrons, the sum of the tension stresses in each set of films being substantially equal to the sum of the compression stresses in the set whereby each set of films is substantially stress free.

7. As an article of manufacture a sheet of thin films comprising a plurality of superposed sets of films with each individual film having a thickness less than 100 quarter wave lengths of light at 546 millimicrons, each set comprising a film of zinc sulfide having an internal compression stress and a film of magnesium fluoride having an internal tension stress, the zinc sulfide film being five times as thick as the magnesium fluoride film whereby each set of films is substantially stress free and the sheet is substantially stress compensated.

8. The method of making a stress-free sheet of films which comprises forming a set of films by depositing on a base a first non-metallic inorganic film which has an internal stress and a thickness of less than 100 quarter wave lengths of light at 546 millimicrons, depositing on said first film a second non-metallic inorganic film which has an internal stress opposite to that in the first film and a thickness of less than 100 quarter wave lengths of light 546 millimicrons, controlling the relative thicknesses of the films to render the stresses in the set substantially equal, depositing additional stress-free sets of films on the first named set and removing the sheet of films from the base.

9. An article of manufacture comprising a base, at least one set of films carried on said base, each set of films comprising at least one film of material having an internal compression stress and at least one film of material having an internal tension stress, each film having a thickness less than one hundred quarter wave lengths of light at 546 millimicrons and being formed of a material selected from the group consisting of antimony trioxide, magnesium fluoride, cryolite, chiolite, tin oxide, molybdic oxide and zinc sulfide, the tension and compression stresses in the films of one set being substantially equal and compensating each other whereby each set of films is substantially stress free.

10. As an article of manufacture a sheet of superposed thin films each of which has a thickness less than one hundred quarter wave lengths of light at 546 millimicrons, said sheet comprising at least one set of films, each set comprising at least one film of material having an internal compression stress and at least one film of a different material having an internal tension stress, said films being formed of materials selected from the group consisting of antimony trioxide, magnesium fluoride, cryolite, chiolite, tin oxide, molybdic oxide and zinc sulfide, the compression and tension stresses in the films of one set being substantially equal and compensating each other whereby each set of films is substantially stress free.

References Cited in the file of this patent

UNITED STATES PATENTS

| | | |
|---|---|---|
| 2,017,705 | Sproxton | Oct. 15, 1935 |
| 2,070,596 | Hansen | Feb. 16, 1937 |
| 2,420,168 | Dimmick | May 6, 1947 |
| 2,552,184 | Koch | May 8, 1951 |